Sept. 28, 1965 C. F. SCHOLZ 3,209,062

MOUNTING AND COOLANT SYSTEM FOR SEMICONDUCTOR HEAT GENERATING DEVICES

Filed Jan. 25, 1963 2 Sheets-Sheet 1

WITNESSES
Theodore F. Wrobel
Edward F. Possessky

INVENTOR
Charles F. Scholz
BY D. Smith
ATTORNEY 3,209,062

MOUNTING AND COOLANT SYSTEM FOR SEMICONDUCTOR HEAT GENERATING DEVICES

Charles F. Scholz, Lakewood, Ohio, assignor to Westinghouse Electric Corporation, Pittsburgh, Pa., a corporation of Pennsylvania Filed Jan. 25, 1963, Ser. No. 253,810
1 Claim. (Cl. 174—15)

The present invention relates to mounting and coolant systems for semiconductor heat generating devices and more particularly to such systems in which cooling is accomplished by means of a closed secondary refrigeration arrangement.

Semiconductor devices, such as transistors, rectifiers, controlled rectifiers and the like, normally have operating temperature limitations prescribed therefor so that the molecular structure in the device is not subjected to crystalline breakdown and eventual device failure. Accordingly, such devices are normally provided with a relatively enlarged mounting base of heat conductive or metallic material for the purpose of controlling the device temperature by heat conduction away from the electrically functional molecular structure in the device. Such heat is conducted to the support on which the device is mounted and then dissipated from the support by means of convective air cooling or by radiation or by both of these cooling modes. Sometimes, where simple heat dissipation methods arei nsufficient, a separate relatively complicated positive cooling system may even be associated with the support member whereby heat extracting coolant conduits are related in heat transfer relation thereto.

In accordance with the broad principles of the present invention, a mounting and coolant system for semiconductor heat generating devices comprises a heat conductive support member in which there is embodied a closed fluid-vapor or secondary refrigerant conduit system. One or more semiconductor heat generating devices are mounted on and in heat transfer relation with the support member such that a reservoir of the coolant fluid is normally in proximity to the device or devices. The fluid then undergoes vaporization upon absorption of device heat, and the vapor circulates through the support member conduit system for condensation and the condensate is returned to the reservoir by gravity or other action. Released heat including that of condensation is discharged to the environment by radiative or convective transfer and the overall heat transfer process eventually reaches a state of equilibrium.

Therefore, an object of the invention is to provide a novel and efficient arrangement for supporting and cooling semiconductor heat generating devices.

Another object of the invention is to provide a supporting and cooling arrangement as characterized in the preceding object wherein the arrangement provides positive cooling without moving mechanical parts.

An additional object of the invention is to provide a supporting and cooling arrangement as characterized in the first object wherein a closed fluid-vapor cycle conduit system is incorporated in a support member of the arrangement.

A further object of the invention is to provide a supporting and cooling arrangement as characterized in the preceding object wherein the device is mounted on the support member in proximity to a reservoir of the fluid.

It is also an object of the invention to provide a supporting and cooling arrangement as characterized in the preceding object wherein vaporized fluid is cooled and condensed in the conduit system remotely from the reservoir and returned to the reservoir substantially by gravitational force.

These and other objects of the invention will become more apparent upon consideration of the following detailed description in conjunction with the attached drawings, in which.

Figure 1:
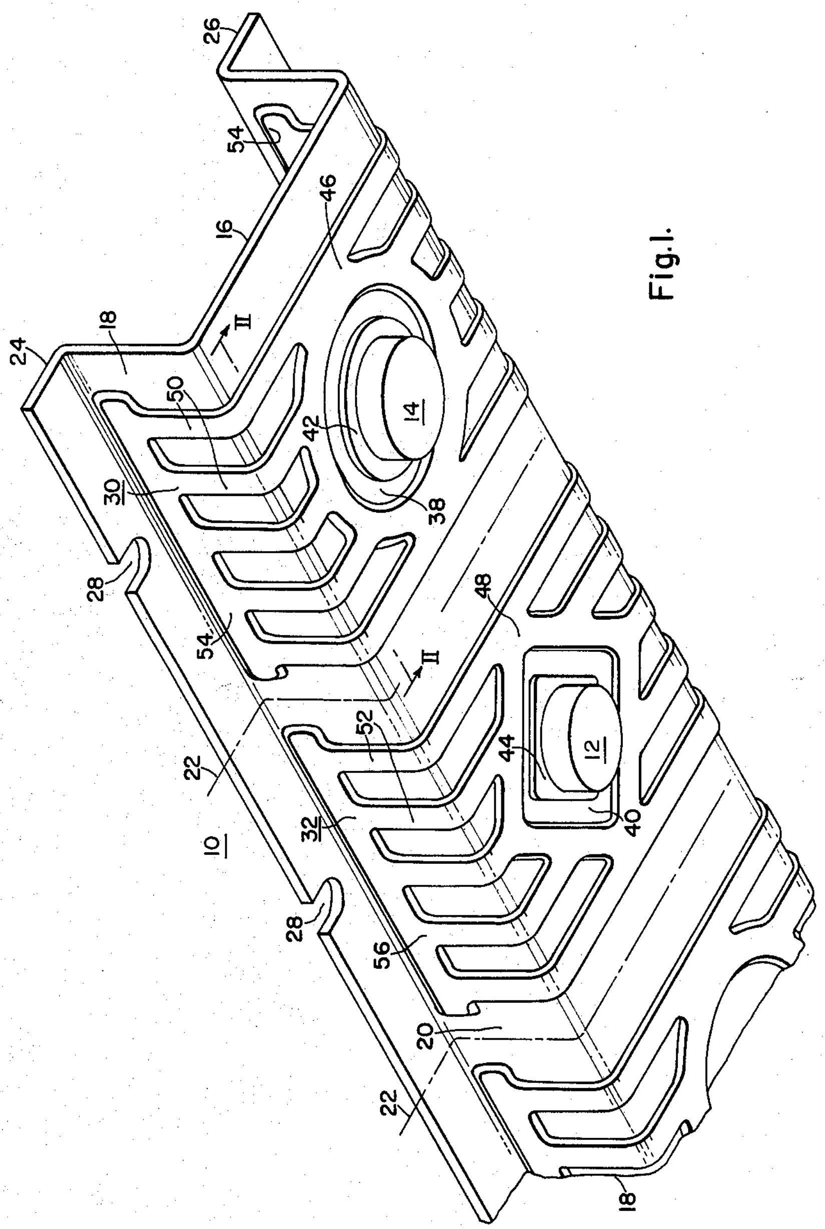
FIGURE 1 is a perspective view of a semiconductor heat generating device supporting and cooling arrangement constructed in accordance with the principles of the invention.

More specifically, there is shown in FIG. 1 a supporting and cooling arrangement 10 for one or more semiconductor heat generating devices such as diodes or transistors 12 and 14. The arrangement 10 comprises and elongated, generally U-shaped in cross section, heat conductive or metallic support member 16 having one or more support units 18 and 20 on which the semiconductor devices 12 and 14 are respectively mounted. The support member 16 can be formed with one or more break lines 22 so as to facilitate separation of the units 18 and 20 if it is desired to utilize less than the number of units 18 or 20 which is normally provided as part of the conductive member 16. Each unit 18 or 20 is provided with laterally opposed and longitudinally extending flanges 24 and 26 with respective fastener openings 28 therein. The support member 16, or the support units 18 and 20 when separated, can thus be readily mounted on a chassis or the like. Further, each support unit 18 or 20 is provided, in this case, with an independent, closed fluid-vapor cycle conduit system 30 or 32 for the purpose of cooling the semiconductor devices 12 and 14 and thereby controlling the operating temperature thereof.

Figure 2:
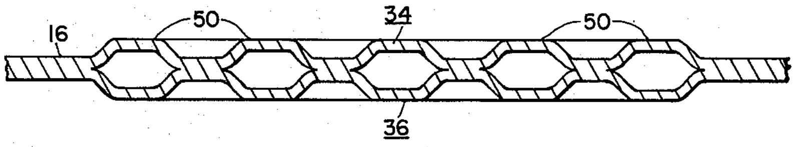
FIG. 2 shows a cross-sectioned view of a portion of the arrangement shown in FIG. 1.

In order to construct the support member 16 with the conduit systems 30 and 32 incorporated therein, or in order to construct similar support members, any suitable process can be employed but it is preferred that the following method be employed. A pair of metallic plates (for example, see plate layers 34 and 36 in FIG. 2) workable to the desired final contour are first deoxidized and one surface of one of the plates is silk screened or stenciled with stop-bond material so as to produce the desired conduit system flow pattern thereon. The other plate is then placed on the stenciled surface and the two plates can then be spot welded if desired and suitably rolled to obtain good interface bonding at areas outside of the flow pattern. The conduit system can then be created or formed by means of hydraulic pressure, that is, by inserting fluid under pressure into an exposed or exposable edge of the rolled member where one or more of the stenciled legs of the conduit system is accessible at the interfacing plate surfaces.

The fluid pressure then expands the plate material along the conduit system pattern to an extent determined by applied pressure, type and size of plate material and other factors. Such metallic materials as aluminum or copper or alloys thereof and steel are suitable for plate use. An insulative heat conductive layer (not shown)

can be disposed on the outer surfaces of the support. Once the conduit system is formed as described, it is then flushed for cleaning purposes and coolant fluid is inserted therein and the system is then sealed. Bending of the bonded plates into the form of the support member or into other forms can be accomplished before or after the conduit forming steps. Moreover, inflation of the plate material along the conduit system pattern can be accomplished outwardly against either plate alone or against both plates together depending upon whether it is desired to have one of the outer opposed plate surfaces finished in a flat condition. An insulative heat conductive layer (not shown) can be disposed on the outer surfaces of the support member 16 so as to provide electrical isolation between the devices 12 and 14, and if the support member material is aluminum the insulative layer can be formed by anodizing the aluminum.

In general, the material selected as the refrigerant or coolant fluid depends upon the cooling requirements of the mounted semiconductor device or devices. One essential characteristic of the selected fluid is, of course, that it be susceptible to vaporization or boiling in the thermal and atmospheric pressure environment in which it is disposed. On this basis, it is preferred that a dry commercially common refrigerant fluid such as Freon or Genetron dry refrigerants be employed, but other fluids ascertainable from a chemical handbook such as ethyl ether, isopropyl chloride, or methylene chloride can be employed.

In view of the foregoing, a more specific understanding of the invention can now be developed. Thus, the bight portion of each U-shaped support unit 18 or 20 is provided with a relatively flat mounting surface 38 or 40 preferably contoured in conformity with the contour of conductive base member 42 or 44 of the supported semiconductor device. Suitable means can be employed for securing the semiconductor device 12 or 14 in mounted position and any electrical leads if desired can be extended outwardly through the side of the support unit 18 or 20 opposite to the device mounting side thereof through suitable openings (not shown).

Adjoining the mounting surfaces 38 and 40 in proximity to the semiconductor device 12 or 14 there is provided a reservoir portion or collection chamber 46 or 48 of the conduit system 30 or 32. Preferably, the collection chambers 46 and 48 circumscribe the mounting surfaces 38 and 40 so as to obtain good device cooling. There are extended outwardly from the collection chamber 46 or 48 a plurality of conduit legs 50 or 52 through which vaporized fluid is free to flow for cooling and condensation adjacent surface areas of the support units 18 or 20 progressively more remote from the mounting surface area 38 or 40. Some or all of the conduit legs 50 or 52 also serve as flow return paths for the condensate as it accumulates in the conduit system 30 or 32 remotely from the mounting surface area 38 or 40. If desired, bridging conduit leg 54 or 56 can be employed to communicate the ends of some or all of the conduit legs 50 or 52 together.

Preferably, the support member 16 and the support units 18 and 20 are formed structurally such that the reservoirs or collection chambers 46 and 48 are provided with an elevation below that of substantially all of the balance of the conduit systems 30 and 32 when the support member 16 or support unit 18 or 20 is placed in use. In this manner, condensate return to the reservoirs or collection chambers 46 and 48 is assured by gravitational force. Thus, in this example, the mounting surfaces 38 and 40 and the semiconductor devices 12 and 14 face downwardly when the support member 16 or the support units 18 and 20 are placed in use so that the conduit legs 50 and 52 extend substantially laterally outwardly and upwardly therefrom.

If it is desired to face the semiconductor devices 12 and 14 upwardly, then the support member 16 or support units 18 and 20 can be slightly modified by forming the general overall U-shaped cross section of the support member 16 in the upward direction, and in this manner the flanges 24 and 26 can be employed to suspend the support members 16 from a supporting surface thereabove. In the alternative, if it is desired that the devices 12 and 14 face upwardly and in addition that they be supported above a supporting surface, then the modified structure just described can be further modified by extending an L-shaped member (not shown) downwardly from the upwardly located flanges 24 and 26 such that the base portion of each L-shaped member provides the necessary support for the support members 16 in a reference plane below the device mounting surfaces 38 and 40.

Figure 3:
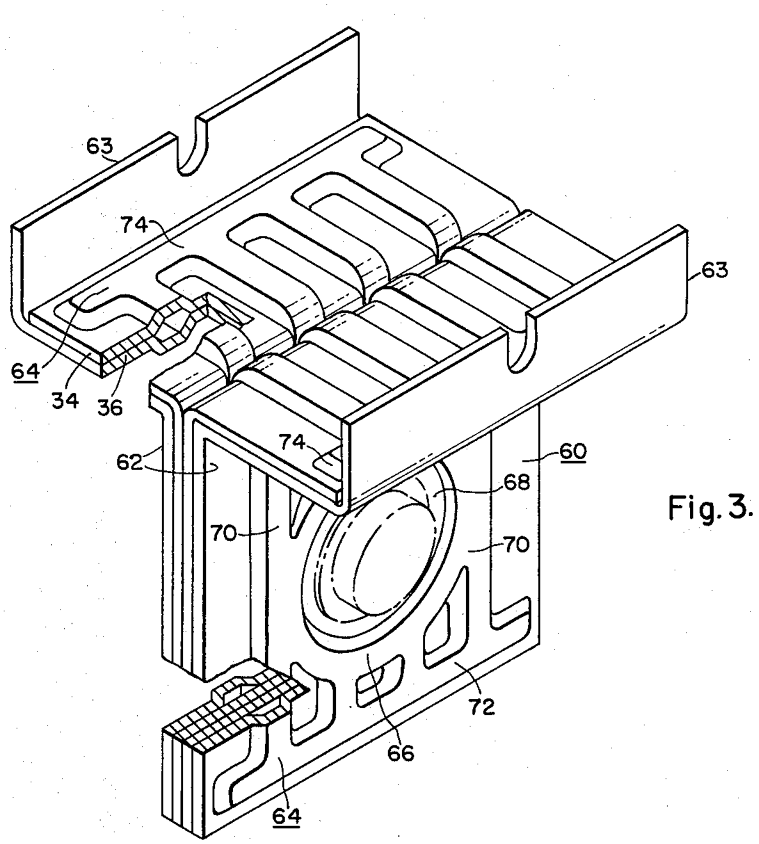
FIG. 3 is a perspective view of another embodiment of the invention.

In FIG. 3, there is shown another embodiment of the invention similar to the embodiments just described. However, this embodiment provides for mounting the semiconductor device 12 or 14 with its mounting base 42 or 44 in a vertical plane and in addition several other notable structural variations. Thus, in this case a support member 60 comprises a pair of L-shaped supporting units 62 placed in back-to-back relation with mounting flanges 63 extending upwardly therefrom. Since the units 62 are placed in back-to-back relation, it is preferred that at least the interfacing surfaces of the units 62 be flat so that the units 62 can be secured together by any suitable means such as nut and bolt means (not shown). A conduit system 64 for each unit 62 comprises a collection chamber 66 disposed in proximity to semiconductor device mounting surface 68 and in communication with conduit legs 70 through bridging conduit leg 72. Of course in this instance, the bridging leg 72 and portions of the conduit legs 70 also serve as a reservoir for the coolant fluid to an extent determined by the height at which it is desired to maintain the fluid level in the collection chamber 6. Thus, vaporized fluid in the collection chamber 66 can rise therefrom to bridging leg 74 and conduit legs 70 with a substantial portion of the condensate returning to the reservoir fluid through the latter legs. If it is desired to mount the support member 60 in the vertically opposite direction, that is with the flanges 62 and 63 pointing downwardly, then the conduit system pattern can be modified to assure that a reservoir of fluid is in proximity to the device mounting surface 68.

The foregoing description has been presented merely to point out the principles of the invention. Accordingly, it is desired that the invention be not limited by the embodiments desribed, but, rather, that it be accorded an interpretation consistent with the scope and spirit of its broad principles.

What is claimed is:

A mounting and cooling arrangement for at least one semiconductor device, said arrangement comprising:

a heat conductive support member having an upper portion and a lower portion, and said support member formed by two opposed and connected surfaces;

a contoured mounting surface provided integral with the said lower portion of said support member, said contoured mounting surface adapted to thermally contact and mount a semiconductor device;

an enclosed conduit system completely formed by contoured channels along the said two opposed and contacting surfaces of said support member, said conduit system disposed throughout said support member including both said upper and lower portions thereof;

a collection chamber completely included within said support member and formed by that portion of said enclosed conduit system which is located in the said lower portion of said support member, said collection chamber disposed completely around and in close thermal relationship with all portions of said contoured mounting surface;

a plurality of upwardly extending conduit legs included in said enclosed conduit system and located predominantly in the said upper portion of said support member, said upwardly extending conduit legs connected to said collection chamber at the lower ends of said legs, said upwardly extending conduit legs connected to each other and forming a bridging conduit at the upper ends thereof which are located thermally remote from said contoured mounting surface;

a readily vaporizable fluid normally located in said collection chamber; and mounting means on said support member proximate the upper portion thereof.

References Cited by the Examiner

UNITED STATES PATENTS

| | | | |
|---|---|---|---|
| 3,035,419 | 5/62 | Wigert | 174—15 X |
| 3,024,298 | 3/62 | Coltses et al. | 174—15 |
| 3,143,592 | 8/64 | August | 174—15 |

JOHN F. BURNS, *Primary Examiner.*

JOHN P. WILDMAN, E. JAMES SAX, *Examiners.*